United States Patent
Vidal et al.

(10) Patent No.: US 12,162,659 B2
(45) Date of Patent: Dec. 10, 2024

(54) COMPOSTABLE LID FOR SEALING A CAPSULE AND A CAPSULE SEALED BY THE LID

(71) Applicant: Ahlstrom Oyj, Helsinki (FI)

(72) Inventors: Florence Vidal, Saint Cyr au Mont d'or (FR); Mireille Roux, Givors (FR); Gianmaria Pavan, Lyons (FR)

(73) Assignee: AHLSTROM OYJ, Helsinki (FI)

( * ) Notice: Subject to any disclaimer, the term of this patent is extended or adjusted under 35 U.S.C. 154(b) by 375 days.

(21) Appl. No.: 17/273,327

(22) PCT Filed: Sep. 4, 2019

(86) PCT No.: PCT/EP2019/073552
§ 371 (c)(1),
(2) Date: Mar. 4, 2021

(87) PCT Pub. No.: WO2020/049029
PCT Pub. Date: Mar. 12, 2020

(65) Prior Publication Data
US 2021/0347547 A1 Nov. 11, 2021

(30) Foreign Application Priority Data
Sep. 4, 2018 (FR) ........................ 1857921

(51) Int. Cl.
*B65D 65/46* (2006.01)
*B32B 5/02* (2006.01)
(Continued)

(52) U.S. Cl.
CPC ............ *B65D 65/466* (2013.01); *B32B 5/022* (2013.01); *B32B 27/12* (2013.01); *B32B 27/36* (2013.01);
(Continued)

(58) Field of Classification Search
CPC .. B32D 85/8043; B65D 65/466; B32B 27/12; B32B 27/36; B32B 5/022
(Continued)

(56) References Cited

U.S. PATENT DOCUMENTS 7,153,530 B2  12/2006  Masek et al.
7,267,794 B2   9/2007  Amick
(Continued)

FOREIGN PATENT DOCUMENTS

EP   2690035 A1   1/2014
EP   3059066 A1 * 8/2016  ........... B65D 65/466
(Continued)

OTHER PUBLICATIONS

International Search Report for International Application No. PCT/EP2019/073552; International Filing Date Sep. 4, 2019; Date of Mailing; Oct. 1, 2019; 4 pages.
(Continued)

*Primary Examiner* — Vincent Tatesure
(74) *Attorney, Agent, or Firm* — CANTOR COLBURN LLP

(57) ABSTRACT

Compostable lid for sealing a beverage capsule, composed of a multi-layer complex comprising at least: —a nonwoven material containing fibres, at least 50% of which by weight are polylactic acid fibres (PLA), —a film containing a polyhydroxyalcanoate (PHA) polymer other than PLA.

19 Claims, 1 Drawing Sheet

(51) Int. Cl.
  *B32B 27/12* (2006.01)
  *B32B 27/36* (2006.01)
  *B65D 85/804* (2006.01)

(52) U.S. Cl.
  CPC ...... *B65D 85/8043* (2013.01); *B32B 2250/02* (2013.01); *B32B 2250/24* (2013.01); *B32B 2262/02* (2013.01); *B32B 2307/7163* (2013.01); *B32B 2307/732* (2013.01); *B32B 2435/02* (2013.01)

(58) Field of Classification Search
  USPC .......................................................... 442/327
  See application file for complete search history.

(56) References Cited

U.S. PATENT DOCUMENTS

| | | | |
|---|---|---|---|
| 7,276,361 | B2 | 10/2007 | Doi et al. |
| 7,543,527 | B2 | 6/2009 | Schmed |
| 7,658,141 | B2 | 2/2010 | Masek et al. |
| 8,956,672 | B2 | 2/2015 | Yoakim et al. |
| 2012/0097602 | A1 | 4/2012 | Tedford |

FOREIGN PATENT DOCUMENTS

| | | |
|---|---|---|
| FR | 3057556 A3 | 4/2018 |
| WO | 2005/020769 A1 | 10/2005 |
| WO | 2012/077066 A1 | 6/2012 |
| WO | 2013/178870 A1 | 12/2013 |
| WO | 2017/063680 A1 | 4/2017 |
| WO | 2017/187024 A1 | 11/2017 |

OTHER PUBLICATIONS

Written Opinion for International Application No. PCT/EP2019/073552; International Filing Date Sep. 4, 2019; Date of Mailing; Oct. 1, 2019; 5 pages.

Requisition by the Examiner in Canadian Patent Application No. 3,110,761; May 21, 2024; Canadian Intellectual Property Office.

\* cited by examiner

COMPOSTABLE LID FOR SEALING A CAPSULE AND A CAPSULE SEALED BY THE LID

PRIORITIES AND CROSS REFERENCES

This Application claims priority from International Application No. PCT/EP2019/073552 filed on 4 Sep. 2019 and French Application No. 1857921 filed on 4 Sep. 2018, the teachings of each of which are incorporated by reference herein in their entirety.

FIELD OF INVENTION

The invention relates to a lid designed to seal a capsule, in particular a coffee capsule. The invention also relates to a capsule sealed by the said lid. Finally, it relates to the use of this lid for sealing a capsule containing a foodstuff, in particular ground coffee.

In what follows in the description, the invention is described in relation to coffee capsules. It can nevertheless be applied in all fields where the lid encloses food substances and must be resistant to water, pressure, tearing and advantageously heat sealable on a capsule or any other food container. More specifically, the invention applies to a lid designed to seal a capsule containing a dry powder (for example coffee, tea, hot chocolate, etc.) to prepare a beverage.

PRIOR ART

Coffee pods available on the market generally contain about 5 to 15 g of ground coffee. The quantities in mass are smaller for tea, although the volume of matter to infuse is generally comparable. The percolation time of coffee machines is typically from 10 to 60 seconds for a volume of water of about 30 to 40 ml for expresso capsules. The range of percolation times is identical for a volume of water of about 120 to 300 ml for filter coffee pods.

In the food industry, the materials used are regularly subject to ever more stringent requirements, in particular concerning the environment. Thus, products currently being developed are not only designed to meet customers' tastes. They must also respect the environment. Respect for the environment may be regulatory. It also increasingly reflects the tendency of consumers to choose reusable, recyclable or degradable products.

Two kinds of coffee pod are currently offered on the market, namely:
- flexible pods essentially composed of a non-woven material bag containing coffee,
- rigid pods or capsules composed of the capsule itself, closed by means of a seal.

The invention relates specifically to rigid capsules.

Capsules of the Nespresso® type are well known on the European market. Such capsules are described, for example, in U.S. Pat. Nos. 7,153,530 and 7,658,141. These capsules typically have a sidewall in the shape of a truncated cone and a bottom formed of aluminium (20-100 µm), pure or multi-layer plastic, a cardboard/aluminium/plastic composite or a plastic/cardboard composite. A polyurethane type layer is provided at the bottom of the capsule to filter the coffee. The Nespresso® capsule seals can be formed from various materials, such as aluminium or a multi-layer composite of paper, aluminium and/or plastic (for example polypropylene (PP), polyethylene (PE), polyamide (PA), polyethylene terephthalate (PET), ethylene vinyl-alcohol (EVOH), polyvinylidene chloride (PVDC), etc.). In practice, the circular seal is heat-welded or crimped around the edge of the capsule.

However, there is a high demand for changing these rigid, non-compostable pods to compostable pods.

The document U.S. Pat. No. 8,956,672 describes capsules of the Nespresso® type with the specific characteristics of an inverted cup-shaped body. In the embodiments illustrated, the lid is fixed on an inwardly curved peripheral flange. It can be formed from various materials, such as aluminium or a multi-layer composite of paper, aluminium and/or plastic (for example polypropylene (PP), polyethylene (PE), polyamide (PA), polyethylene terephthalate (PET), ethylene vinyl-alcohol (EVOH), polyvinylidene chloride (PVDC), etc.). The lid is sealed to the inwardly curved part of the peripheral flange and contains orifices calibrated so as to create restrictions causing an increase in pressure during the extraction process. A filter may be placed between the chamber and the lid.

The document EP2690035A describes other shapes of capsules. In particular, it describes a capsule with a perforated bottom reinforced by a circular rib, a truncated or frustoconical sidewall with a peripheral flange, and a lid fixed on the rim after the capsule has been filled with the ingredient.

Other capsule designs are described in the document U.S. Pat. No. 7,543,527. The capsule is formed from a cylindrical or slightly conical cup. It contains a means for dispensing positioned inside the cup on an upper shoulder close to the lid, allowing the flow of liquid into the capsule during infusion to be modified. The cup also contains a lower means of dispensing allowing excess liquid to be collected outside the beverage cup during extraction. The cup and lid are composed of a gas-proof multi-layer composite film.

Processes and devices for preparing food products or beverages have also been described in the document EP 1 659 909 B1. Thus, this document describes a capsule composed of a bottom and a sidewall fitted with a peripheral flange. The capsule is typically made of plastic such as EVOH, PVDC, PP, PE and/or PA in single or multi-layer form. A lid is heat welded to the capsule. The lid is made of perforatable material such as aluminium, aluminium/plastic, cardboard/plastic, cardboard/aluminium/plastic or single or multi-layer plastic.

The document EP 2 648 579 B1 describes a cartridge of capsules of various truncated, prismatic, pyramidal etc. shapes. The capsules have a peripheral flange on which a lid is heat sealed.

Although several methods of making capsules have been proposed, most of them are not compostable.

To solve this problem, capsules have been developed composed of plastic based on polylactic acid (PLA) or so-called "PLA compatible" plastics. The so-called "PLA compatible" materials are a mixture of PLA and plant fibres. They are biodegradable and compostable. Thus, the capsules meet the compostability conditions imposed by standard EN 13432.

In what follows in the description and the claims, the term "compostable lid" designates a lid containing at most 5% by weight of the total proportion of organic constituents without determined biodegradability (for example from non-compostable binder or fibres) thereby meeting the standard EN 13432.

Similarly, "compostable capsule or capsule body" designates a capsule containing at most 5% by weight of the total proportion of organic constituents without determined biodegradability (for example from non-compostable binder or fibres) thereby meeting the standard EN 13432.

Up to now, no satisfactory solution has been proposed for combining compostable lids with the said capsules. This is not surprising given the numerous constraints related to the lid. Indeed, such pods are likely to be used in coffee machines at pressures and temperatures which they must withstand mechanically.

Essentially, capsules are used in a pod or individual capsule coffee machine according to the following process. Once the capsule has been inserted in its location, the bottom is pierced. The orifices formed allow water heated to 96° C. to be introduced into the capsule body at a pressure between 10 and 12 bars. The water filling the capsule gradually exerts a pressure on the lid, which comes into contact with spike type drillers arranged in the machine. The pressure when the lid is perforated and during percolation most often lies between 5 and 15 bars according to the coffee grain size. Once the lid has been pierced to the pattern of the needles, the coffee pours into the cup. Manufacturers impose a certain number of conditions for the pouring of the coffee. In particular, there must be no powder in the cup. Furthermore, a coffee dose of about 30 ml must pour in about 30 seconds. The liquid being poured must, moreover, have a colour and density similar to that of the froth. There are also a number of constraints once the coffee has been poured and while the capsule has not yet been ejected. Assuming that the user only ejects the capsule several hours after the coffee has been poured, i.e. once the capsule temperature has fallen to ambient temperature, the capsule must not be deformed. If it is deformed, it does not drop into the receptacle provided when a new capsule is inserted. The lid must not delaminate.

Within the scope of this invention, a lid is considered satisfactory from a pressure resistance point of view when the lid does not tear when it is subjected to a pressure of 5 to 15 bars exerted by a mixture of powder and water at the moment when the lid is perforated and during percolation. Before perforation, the lid must not tear under the effect of increasing water pressure in the capsule. After perforation, the perforation holes must not tear, thereby enlarging under the effect of pressure, in order not to allow some of the powder to pass through and to maintain the characteristics of the coffee, the froth in particular.

The document FR 3 050 725, in the name of the Applicant, describes a compostable lid for sealing a capsule containing coffee in particular, composed of a multi-layer complex combining a non-woven material based on polylactic acid fibres with a waxed paper support.

Although this lid is satisfactorily compostable, this lid provides a limited barrier to moisture.

The document US 2012/0097602 describes a capsule sealed with a lid. The wall of this capsule is composed of an oxygen barrier layer sandwiched between two layers, one based on PLA and the other based on PLA or a crosslinked PHA/PLA copolymer. The lid may have two layers. In one particular embodiment, one of the two layers is based on a heat-resistant, biodegrable polymer chosen from the polyolefins (PE, PP etc.) or polyesters (PHA other than PLA, PLA), while the other layer is based on PLA. No specific combination of materials is described.

The problem that the invention proposes to solve is therefore how to design a compostable lid to seal a capsule, in particular a capsule containing coffee that meets the conditions of use of this type of lid in coffee machines, in particular machines with pods or individual capsules, in particular one that is moisture resistant and resistant to the pressure exerted by the mixture of powder and water, that does not delaminate, with the filter properties preventing coffee from going into the cup during percolation.

Another problem that the invention sets out to solve is that of designing a lid that can be incorporated in current capsule production lines without substantially modifying said lines.

An additional problem that the invention sets out to solve is that of designing a lid that is a barrier to aromas.

DESCRIPTION OF THE INVENTION

To achieve this, the Applicant has developed a lid composed of 2 layers, respectively a non-woven material based on fibres of polylactic acid (PLA) and a film with a specific thickness based on a polyhydroxyalcanoate polymer (PHA) other than PLA. The lid thus obtained is pressure and moisture resistant and can easily be incorporated into existing capsule production lines. Moreover, it presents a satisfactory barrier to aromas.

More particularly, the subject of the invention is a compostable lid for sealing a drink capsule containing coffee for example, composed of a multi-layer complex containing at least:

a non-woven material comprising biodegradable fibres, at least 50% of which by weight are polylactic acid fibres (PLA), a film containing a polyhydroxyalcanoate (PHA) polymer other than PLA, the thickness of the film being between 50 µm and equal to or less than 300 µm.

According to a first characteristic, the lid according to the invention contains a non-woven material containing fibres, at least 50% by weight of which, advantageously 80%, preferably 100% by weight is composed of polylactic acid (PLA)-based fibres.

Polylactic acid (PLA) has the particular advantage of being biosourced, biodegradable and compostable. In what follows in the description and the claims, the terms "polylactic acid" and "PLA" designate a renewable, biodegradable, aliphatic, thermoplastic polyester formed from lactic acid or a source of lactic acid such as maze starch, sugar cane, etc. The term PLA may designate all forms of stereoisomers of PLA of the L- or D-type, and their racemic mixture. For example, PLA may refer to D-polylactic acid, L-polylactic acid (also known as PLLA), D, L-polylactic acid, meso-polylactic acid, together with any combination of D-polylactic acid, L-polylactic acid (also known as PLLA), D, L-polactic acid, meso-polylactic acid. The PLAs may, for example, have a number average molecular weight of between 15,000 and about 300,000. In the preparation of PLA, bacterial fermentation may be used to produce lactic acid, which can be oligomerised then dimerised catalytically to produce the monomer for polymerisation by ring opening. The high molecular weight PLA can thus be prepared by polymerisation by ring opening of the monomer by using, for example, a stannous octanoate, tin (III) chloride, etc., catalyst According to the invention, if necessary, the complement to 100% of fibres is composed of biodegradable fibres.

In what follows in the description and in the claims, the expression "biodegradable fibres" means fibres that can be decomposed into organic substances by living organisms such as microorganisms.

The biodegradable fibres are advantageously chosen from the group comprising fibres of polyethylene (PE), polypropylene (PP), polybutane (PB), starch-based polymers, cellulose-based polymers, ethylene-vinyl alcohol (EVOH), polybutanediolsuccinic acid (PBS), biosourced cellulose fibres chosen from the group comprising cotton, wood fibres and flax fibres.

The term "cellulose-based polymer" designates a polymer or combination of polymers which can be derived or prepared, of, from cellulose. Cellulose-based polymers that can be used in the embodiments of this invention may include for example cellulose esters such as cellulose formate, cellulose acetate, cellulose diacetate, cellulose proprionate, cellulose butyrate, cellulose valerate, and their mixtures.

In a preferred embodiment, the fibres are composed exclusively of polylactic acid (PLA)-based fibres.

Advantageously, at least 40% by weight of the fibres are heat-sealable fibres. Heat-sealable fibres preferably have a melting point of at least 100° C.

In general, a non-woven material is a material obtained by a random arrangement of interlocking individual fibres. The bonding of the fibres can be conferred by an adhesive or binders (latex, polyvinyl alcohol, starch, etc.), by heating, by pressure or by needling, for example. Many processes for preparing non-woven materials are in general knowledge in the industry. They include for example processes for drawing fibres by heating/blowing ("meltblowing"), drawing fibres directly or by "spin laying", "spunbond", "carding", dispersion by air jet ("air laying") or dispersion by water ("wet laying").

Apart from fibres, the non-woven material may also contain additives, mineral fillers. By incorporating additives, or fillers, or fibres other than those of PLA, the melting point of the PLA-based non-woven material may be modified.

In practice, the non-woven material contains at least 85%, more preferentially at least 90% by weight of fibres.

In an advantageous embodiment, the bonding of the fibres, and hence of the non-woven material, is obtained without adhesive or binder by a spunbond manufacturing process.

Under these conditions, the non-woven material contains 100% by weight of fibres, of which at least 50% by weight, advantageously 100% by weight are preferentially composed of PLA fibres.

The non-woven material can be single layer. Advantageously, it may be a double layer non-woven material. The double layer may be single component, i.e. only contain a single type of PLA or two-component, i.e. contain 2 types of PLA with different melting points.

In one particular embodiment, the PLA fibres have a core/envelope structure, i.e. the fibres are two-component fibres. In practice, the fibres contain a core containing polylactic acid (PLA-1) coated with an envelope or sheath containing polylactic acid (PLA-2). The core has a diameter d1, and the sheath a radial thickness e1. The ratio of the diameter d1 to the radial thickness e1 may be modified to vary the properties of the fibres. In practice, the PLA-1 of the core is a copolymer of lactic acid monomer L1 and lactic acid monomer D1. The PLA-2 of the sheath is a copolymer of lactic acid L2 monomer and lactic acid D2 monomer, with the level of D2 monomer greater than the levels of PLA-1 D1 monomers. The core can moreover contain a polymer plastifier.

According to another characteristic, the non-woven material has an inner face and an outer face, the inner face having a melting point lower than that of the outer face, with the inner face intended to be positioned in relation to the film containing a polyhydroxyalcanoate polymer (PHA).

The air permeability of the non-woven material measured according to standard DIN 53887 is advantageously between 3,000 and 5,0001/m$^2$/s.

The PLA fibre-based non-woven material advantageously has a thickness between 20 and 30 micrometers.

Finally, in practice the grammage of the non-woven material is between 5 and 100 g/m$^2$, advantageously between 10 and 30 g/m$^2$, still more advantageously between 15 and 20 g/m$^2$, preferably of the order of 18 g/m$^2$.

According to another characteristic, the multi-layer complex furthermore contains a film containing a polyhydroxyalcanoate polymer (PHA) other than PLA. According to the invention, the film has a thickness between 50 μm and 300 μm.

In what follows in the description and in the claims, the term "polyhydroxyalcanoate (PHA)" generally designates renewable thermoplastic aliphatic polyesters which may be produced by polymerisation of hydroxy aliphatic monomers (including dimers of hydroxy aliphatic acids), by the bacterial fermentation of starch, sugars, lipids, etc. The PHAs may contain one or more poly-beta-hydroxybutyrates (PHB) (also known as poly-3-hydroxybutyrate), poly-alpha-hydroxybutyrate (also known as poly-2-hydroxybutyrate), poly-3-hydroxypropionate, poly-3-hydroxyvalerate, poly (3-hydroxybutyrate-co-3-hydroxyhexanoate) (PHBH), poly-4-hydroxybutyrate, poly-4-hydroxyvalerate, poly-5-hydroxyvalerate, poly-3-hydroxyhexanoate, poly-4-hydroxyhexanoate, poly-6-hydroxyhexanoate, polyhydroxybutyrate-valerate (PHBV), polyglycolic acid, polylactic acid (PLA), etc., including copolymers, mixtures, and combinations, etc., of various PHA polymers, etc. The PHAs may be synthesised by processes described, for example, in the document U.S. Pat. Nos. 7,267,794, 7,276,361.

In an advantageous embodiment, the PHA is poly (3-hydroxybutyrate-co-3-hydroxyhexanoate) (PHBH).

In practice, the polyhydroxyalcanoate polymer (PHA)-based film, in particular PHBH, is extruded through a flat die and stretched as well as calendered.

According to the invention, the film has a thickness between 50 μm and 300 μm. When the film thickness is less than 50 μm, the lid does not sufficiently resist the pressure and flowing starts before the coffee is properly extracted. Moreover, when the film has a thickness less than 50 μm, the lid is not rigid enough and the perforations can tear, which, as seen previously, is unacceptable. When the thickness of the film is greater than 300 μm, the lid is too resistant to pressure and there is poor flowing or no flowing of the coffee. Moreover, if the film has a thickness greater than 300 μm, the lid is too rigid and it is not optimally perforated, resulting in poor flowing of the coffee.

Advantageously, the film has a thickness equal to or greater than 100 μm, equal to or less than 200 μm, still more advantageously equal to or greater than 125 μm and equal to or less than 200 μm.

Apart from PHA, the film may contain additives such as mineral fillers in particular.

In practice, the PHA represents between 80 and 98% by weight of the film, advantageously between 90 and 95% by weight.

Advantageously, the grammage of the film containing the PHA polymer is between 150 and 500 g/m$^2$, advantageously between 200 and 300 g/m$^2$, preferably of the order of 240 g/m$^2$.

According to the invention, the film containing the PHA polymer is combined with a non-woven material by heat bonding, in particular by hot calendering or hot pressing. On a pilot machine, the temperatures are between 110 and 150° C., advantageously between 120 and 145° C. The applied pressure is between 130 and 230 kN, advantageously of the order of 150 to 200 kN. The speed is between 4 and 7 m/s, preferably of the order of 5.5 m/s.

In one particular embodiment, the lid is composed exclusively of non-woven material comprised of polylactic acid (PLA)-based fibres and the film is comprised of a polyhydroxyalcanoate polymer (PHA) other than PLA.

The thickness of the multi-layer complex, the object of the invention, is typically between 110 and 310 micrometres, and advantageously between 150 and 200 micrometres.

According to an additional characteristic, the lid is compostable thereby meeting the standard EN 13432.

The invention also relates to a beverage capsule with a compostable lid, such as previously described. In one particular embodiment, the capsule contains coffee.

In a preferred embodiment, the capsule itself is in PHA/PLA or a compatible PHA material. This has the advantage of bonding the lid to the capsule by heat sealing the non-woven part of the lid insofar as the materials are compatible (PHA or PHA compatible). The so-called "PHA compatible" materials are a mixture of PHA and plant fibres. In practice, ultrasonic heat sealing is used.

Preferably, the beverage capsule is used in a machine for dispensing individual beverages.

Advantageously, the beverage capsule is compostable and meets the standard EN 13432.

The invention also relates to the use of the compostable lid as previously described to seal a beverage capsule, in particular of coffee. To do this, and according to another aspect, the non-woven material is applied to the surface of the capsule facing the lid.

The invention also relates to the manufacturing process of this capsule which comprises the following steps:
   a strip of a multi-layer complex is formed consisting successively of:
      a non-woven material containing fibres, at least 50% of which by weight are polylactic acid fibres (PLA),
      a film containing a polyhydroxyalcanoate (PHA) polymer other than PLA, the thickness of the film being between 50 μm and 300 μm,
   in parallel, the recesses formed in a plate are filled by means of individual capsules, the strip is superposed on the plate such that the non-woven material is facing the plate,
   the strip is cut up to each of the capsules to form the lids,
   the lids are heat sealed on to the capsules.

According to the process, the heat sealing is ultrasonic.

The invention and advantages that result can be better appreciated in the following figures and examples illustrating the invention, and not in any limited way.

EMBODIMENTS OF THE INVENTION

Figure 1:
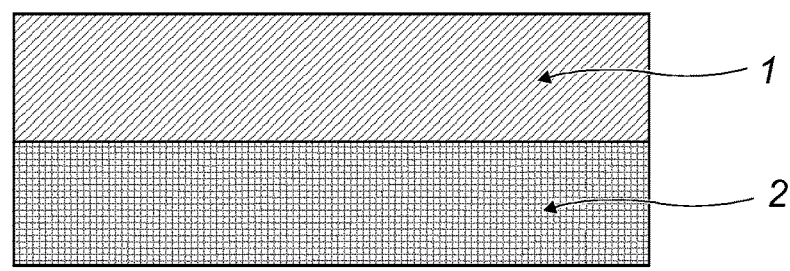
FIG. 1 illustrates the lid that is the object of this invention.

FIG. 1 shows a lid in the form of a multi-layer complex comprising successively:
   a film 1 comprising a PHBH polymer, the thickness of the film being equal to 200 μm;
   a non-woven material 2 comprising 100% by weight of PLA fibres.

The non-woven material 2 is formed exclusively from PLA fibres. The PLA fibres are of a single component. The non-woven material is manufactured by spunbond technology. The thickness of the non-woven material is 20 μm.

The non-woven material and the film are combined by hot calendering in such a way that the face of the non-woven material with the lowest melting point is facing the film. The lid shown in FIG. 1 is then ultrasonically heat sealed on to a capsule filled with ground coffee and composed essentially of compostable PHA-based polymers. The capsules thus obtained enable a flow of coffee within the time required by the manufacturers, and the coffee is accompanied by a froth of quality equivalent to that of current capsules. The capsule thus manufactured meets the compostability standard EN 13432.

Figure 2:
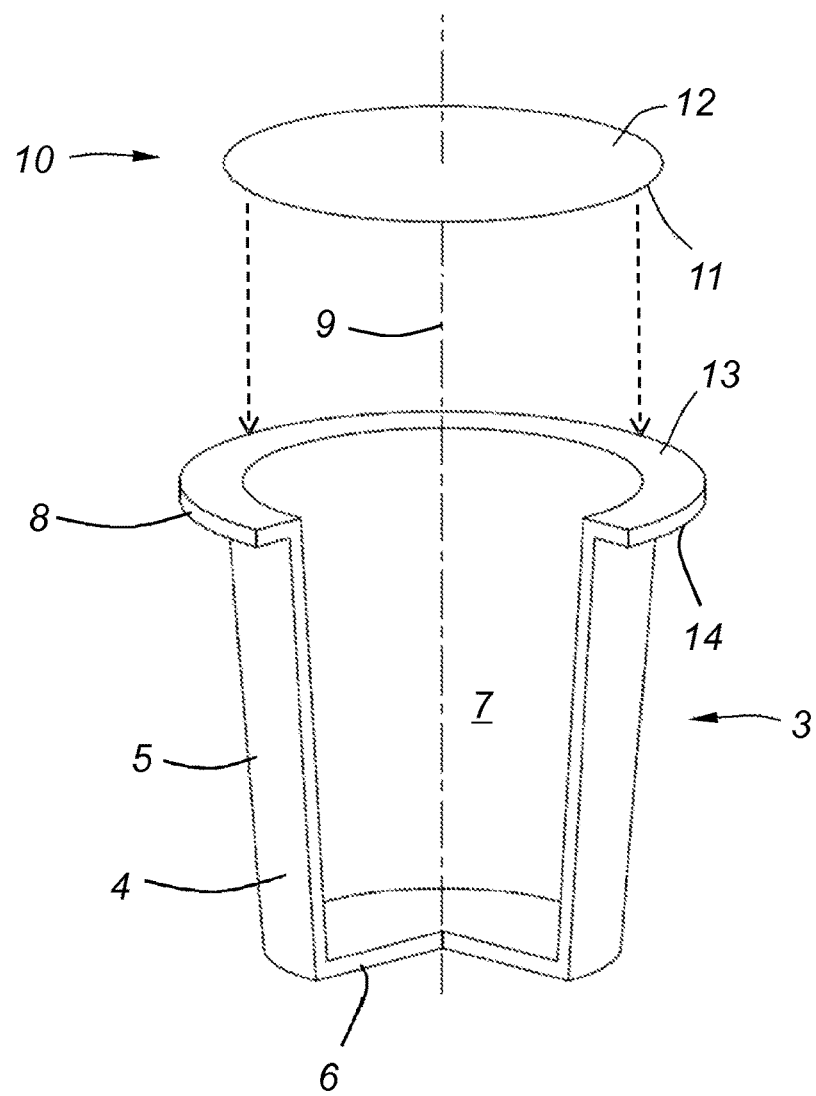
FIG. 2 shows a beverage capsule with a lid according to the invention.

FIG. 2 shows a capsule with a shape adapted to the lid of the invention. This type of shape is representative of capsules generally used and described, in a non-limited way, in documents U.S. Pat. Nos. 7,153,530 and 7,658,141 for Nespresso® capsules, U.S. Pat. No. 7,543,527, EP 2 690 035 B1, EP 1 659 909 B1 and/or EP 2 648 579 B1. As a result, the capsule of FIG. 2 may possibly have one or more of the characteristics described in these documents, in combination with the lid of this invention.

The capsule 3 generally has a body 4. The body 4 has a sidewall 5 and a bottom 6 defining a central volume 7. The sidewall 4 may be cylindrical, conical, truncated, etc. The sidewall has an edge 8 extending radially outwards from the longitudinal axis 9 of the lid 10 of the capsule 3. The edge 8 has a lower face 14 and an upper face 13.

The capsule may be used in two ways, i.e. when the lid 10 is at the top of the capsule while brewing and extraction are taking place (and conversely, when the lid (10) is at the base of the capsule during brewing and extraction). In certain applications, the bottom 6 of the capsule may also have a second lid in conformity with this invention, which can be pierced in the same way as the lid 10.

The capsule 3 has one or more means of filtering and/or dispensing the contents of the capsule. Although it is not shown, the filter material can partially or completely cover the upper face of the edge. In other embodiments also not shown, the filter material can be fixed to the bottom of the capsule 3 or onto the lower face 14 of the lid 10.

In practice, the body of the capsule 4 is manufactured and it is filled with an ingredient (for example ground coffee, tea leaves, a hot chocolate mixture, etc.). The lid 10 is then fixed to the capsule 3. Usually, the lower face 11 of the lid 10 is fixed to the upper face 12 of the edge 8 of the body of the capsule 4.

The lid 10 is heat sealed to the capsule 3 such that the non-woven material 2 is in contact with the capsule 3. In other embodiments, the lid 10 can be sealed to the capsule 3 with an adhesive, by laser welding, by ultrasonic welding or other known procedures.

Assessment of the Moisture Barrier

In this example, we compare the performance of the moisture barrier of the lid of the invention according to FIG. 1 with a lid as described in document FR 3 050 725. This second lid is composed of a real waxed paper support, a layer of adhesive and non-woven material in PLA (counter-example).

The rate of transmission of moisture through these two lids is measured at 23° C. at a relative humidity of 50%.

The rate of transmission of moisture through the lid according to the invention is 7 g/m$^2$·day+/−2 g/m$^2$·day. The rate of transmission of moisture through the lid according to FR 3 050 725 is 85 g/m$^2$/day+/−2 g/m$^2$/day.

Thus, the lid according to the invention affords a decrease in moisture transmission of nearly 92%.

Assessment of the Aroma Barrier

In this example, we reproduce the lid of FIG. 1.

Five capsules containing ground coffee were sealed with each of the lids (samples 200*a*, 200*b*, 200*c*, 200*d*, 200*e* and 200*f*).

The capsules thus obtained were placed in jars. The jars were then hermetically sealed. After a given period of time, the jars were opened and the odour released during opening was measured by olfactory sensing.

The first jar was opened after 15 days and sample 200*a* released no odour or a very weak odour. Fifteen days after opening the first jar, the second jar was opened. Sample 200*b* released no odour or a very weak odour. One month after opening the first jar, the third jar was opened. Sample 200*c* released a very weak odour. Two months after opening the first jar, the fourth jar was opened. Sample 200*d* released a very weak odour. Three months after opening the first jar, the fifth jar was opened. Sample 200*e* released a very weak odour.

The invention claimed is:

1. Compostable lid for sealing a container, composed of a multi-layer complex comprising at least:
   a non-woven material containing fibres, at least 50% of which by weight are polylactic acid fibres (PLA),
   a film containing a polyhydroxyalcanoate (PHA) polymer other than PLA, characterized in that the film has a thickness between 50 µm and 300 µm,
   characterized in that the non-woven material is a double layer non-woven material comprising two types of PLA, wherein the non-woven material has an inner face and an outer face, the inner face having a melting point lower than that of the outer face, the inner face being placed facing the film comprising the polyhydroxyalcanoate (PHA) polymer, and
   wherein the film is placed directly on the non-woven material.

2. Lid according to claim 1, characterized in that the balance to 100% of fibres comprising the non-woven material is composed of fibres chosen from the group comprising fibres of polyethylene (PE), polypropylene (PP), polybutane (PB), starch-based polymers, cellulose-based polymers, ethylene-vinyl alcohol (EVOH)-based polymers, polybutanediolsuccinic acid (PBS), biosourced cellulose fibres chosen from the group comprising cotton, wood fibres and flax fibres.

3. Lid according to claim 1, characterized in that the fibres comprising the non-woven material are exclusively polylactic acid (PLA)-based fibres.

4. Lid according to claim 1, characterized in that at least 40% of the fibres comprising the non-woven material are heat-sealable.

5. Lid according to claim 1, characterized in that the non-woven material comprises at least 85% by weight of fibres.

6. Lid according to claim 1, characterized in that the grammage of the non-woven material is between 5 and 100 g/m$^2$.

7. Lid according to claim 1, characterized in that the PHA polymer represents between 80 and 98% by weight of the film.

8. Lid according to claim 1, characterized in that the film comprising the polyhydroxyalcanoate (PHA) polymer has a thickness between 100 and 200 µm.

9. Lid according to claim 1, characterized in that the film comprising the polyhydroxyalcanoate (PHA) polymer has a grammage between 150 and 500 g/m$^2$.

10. Lid according to claim 1, characterized in that it is composed of a multi-layer complex, itself composed of:
    a non-woven material comprising fibres, of which at least 50% by weight is composed of polylactic acid (PLA)-based fibres,
    a film comprising a polyhydroxyalcanoate ((PHA) polymer other than PLA, the film having a thickness equal to or greater than 50 µm and equal to or less than 300 µm,
    characterized in that the non-woven material is a double layer non-woven material comprising two types of PLA, wherein the non-woven material has an inner face and an outer face, the inner face having a melting point lower than that of the outer face, the inner face being placed facing the film comprising the polyhydroxyalcanoate (PHA) polymer.

11. Lid according to claim 1, characterized in that it is compostable and meets the standard EN13432.

12. Container, in particular a coffee container, having a lid according to claim 1.

13. Container according to claim 12, characterized in that the capsule itself is of PHA/PLA polymer.

14. Container according to claim 12, characterized in that the container is compostable and meets the standard EN13432.

15. Use of the container according to claim 12 in a machine dispensing individual beverages.

16. Lid according to claim 1, characterized in that the non-woven material comprises at least 90% by weight of fibers.

17. Lid according to claim 1, characterized in that the grammage of the non-woven material is between 10 and 30 g/m$^2$.

18. Lid according to claim 1, characterized in that the PHA polymer represents between 90 and 95% by weight of the film.

19. Lid according to claim 1, characterized in that the film comprising the polyhydroxyalcanoate (PHA) polymer has a grammage between 20 and 300 g/m$^2$.

* * * * *